United States Patent [19]

Outa

[11] Patent Number: 4,891,692
[45] Date of Patent: Jan. 2, 1990

[54] COLOR IMAGE READING APPARATUS HAVING VARIABLE EXPOSURE CONTROL

[75] Inventor: Kenichi Outa, Yokohama, Japan

[73] Assignee: Canon Kabushiki Kaisha, Tokyo, Japan

[21] Appl. No.: 117,752

[22] Filed: Nov. 6, 1987

[30] Foreign Application Priority Data

Nov. 13, 1986 [JP] Japan .................. 61-271468

[51] Int. Cl.$^4$ .............................................. H04N 1/46
[52] U.S. Cl. ........................................ 358/75; 358/80
[58] Field of Search ............................ 358/75, 78, 80

[56] References Cited

U.S. PATENT DOCUMENTS

| | | | |
|---|---|---|---|
| 4,371,260 | 2/1983 | Yoshimoto et al. | 358/75 X |
| 4,402,015 | 8/1983 | Yamada | 358/80 X |
| 4,410,909 | 10/1983 | Ueda et al. | 358/75 |
| 4,448,521 | 5/1984 | Shiota | 355/77 |
| 4,467,364 | 8/1984 | Konagaga | 358/80 |
| 4,472,736 | 9/1984 | Ushio et al. | 358/75 |
| 4,667,228 | 5/1987 | Kawamura et al. | 358/80 |
| 4,677,287 | 6/1987 | Ejima | 250/205 |
| 4,679,073 | 7/1987 | Hayashi | 358/80 |
| 4,688,099 | 8/1987 | Funston | 358/54 |
| 4,710,823 | 12/1987 | Kitazawa | 358/280 |
| 4,729,016 | 3/1988 | Alkofer | 358/75 X |
| 4,731,662 | 3/1988 | Udagawa et al. | 358/75 |
| 4,731,671 | 3/1988 | Alhofer | 358/75 X |
| 4,766,503 | 8/1988 | Lambert et al. | 358/80 X |
| 4,769,695 | 9/1988 | Terashita | 358/75 X |
| 4,792,847 | 12/1988 | Shimazaki et al. | 358/75 X |

FOREIGN PATENT DOCUMENTS

| | | | |
|---|---|---|---|
| 144188 | 6/1985 | European Pat. Off. | 358/80 |
| 1577122 | 8/1969 | France. | |
| 53-134437 | 6/1978 | Japan. | |
| 58-19587A | 11/1983 | Japan. | |
| 60-37559A | 2/1985 | Japan. | |
| 60-236577 | 11/1985 | Japan | 358/80 |
| 60-236578 | 11/1985 | Japan | 358/80 |
| 2067043 | 7/1981 | United Kingdom. | |

Primary Examiner—James J. Groody
Assistant Examiner—Mark R. Powell
Attorney, Agent, or Firm—Fitzpatrick Cella Harper Scinto

[57] ABSTRACT

A color image reading apparatus for reading an image of a color negative film having: an exposing unit to expose the color film; a reading unit to read an image recorded on the color film by photoelectrically converting the transmission light from the exposed color film; a detector to detect a density of the image on the basis of an output from the reading unit; and a controller to control an exposure light quantity of the exposing means in accordance with the image density detected by the detector. The detector detects the image density on the basis of a histogram of the output from the reading unit or on the basis of an output of a special color which is output from the reading unit. With this apparatus, the reading operation suitable for the base density and image density of the color negative film can be performed.

39 Claims, 7 Drawing Sheets

COLOR IMAGE READING APPARATUS HAVING VARIABLE EXPOSURE CONTROL

BACKGROUND OF THE INVENTION

1. Field of the Invention

The present invention relates to an apparatus for reading a color image and, more particularly, to a color image reading apparatus for reading an image of a color negative film.

2. Related Art of the Invention

The applicant of the present invention has already proposed an apparatus in which an image recorded on a microfilm is photoelectrically read using an image sensor such as a CCD or the like and electrical image signals are output in U.S. Pat. applications Ser. Nos. 786,638 (filed on Oct. 11, 1985), 854,569 (filed on Apr. 22, 1986), 878,790 (filed on June 26, 1986), 924,433 (filed on Oct. 29, 1986), and the like.

For example, when the image recorded on a microfilm is read, since it is generally a black and white image, by discriminating a transmission light quantity of the film, the image can be relatively easily read.

On the other hand, the present applicant has also already proposed an apparatus for photoelectrically reading an image on a color film in U.S. Pat. continuation application Ser. No. 057,657 (filed on June 8, 1987) and U.S. Pat. application Ser. Nos. 013,119 (filed on Feb. 10, 1987), and 013,731 (filed on Feb. 11, 1987). However, when considering the case where the image on, e.g., a color negative film is read, the transmission factor of the color negative film largely varies in dependence on the exposure conditions upon photographing and even if the CCD output is directly A/D converted, the proper R, G, and B signals cannot be obtained. On the other hand, by properly processing the R, G, and B signals after the A/D conversion in accordance with the state of the film, they can be converted into the proper R, G, and B signals. However, in this case, the number of effective bits of the data decreases, causing the quality of the readout image data to be deteriorated.

SUMMARY OF THE INVENTION

The present invention is made in consideration of the foregoing problems and it is an object of the invention to provide a color image reading apparatus which can preferably read a color image recorded on a film.

Another object of the invention is to provide a color image reading apparatus which can perform the reading operation suitable for the density of a color image recorded on a film.

Still another object of the invention is to provide a color image reading apparatus which can perform a reading operation suitable for the base density of a film and the image density.

Still another object of the invention is to provide a color image reading apparatus comprising: exposing means for exposing a color film; reading means for reading an image recorded on the color film by photoelectrically converting a transmitted light from the exposed color film; detecting means for detecting the density of the image on the basis of an output from the reading means; and control means for controlling an exposure light quantity of the exposing means in accordance with the image density detected by the detecting means.

Still another object of the invention is to provide a color image reading apparatus comprising: exposing means for exposing a color film; reading means for reading an image recorded on the color film by photoelectrically converting a transmitted light from the exposed color film; detecting means for detecting the base density of the color film and the density of the image; and control means for controlling the image reading operation in accordance with the base density and image density which were detected by the detecting means.

The above and other objects and features of the present invention will become apparent from the following detailed description and the appended claims with reference to the accompanying drawings.

DETAILED DESCRIPTION OF THE PREFERRED EMBODIMENT

The present invention will be described hereinbelow with respect to a preferred embodiment.

Figure 3:
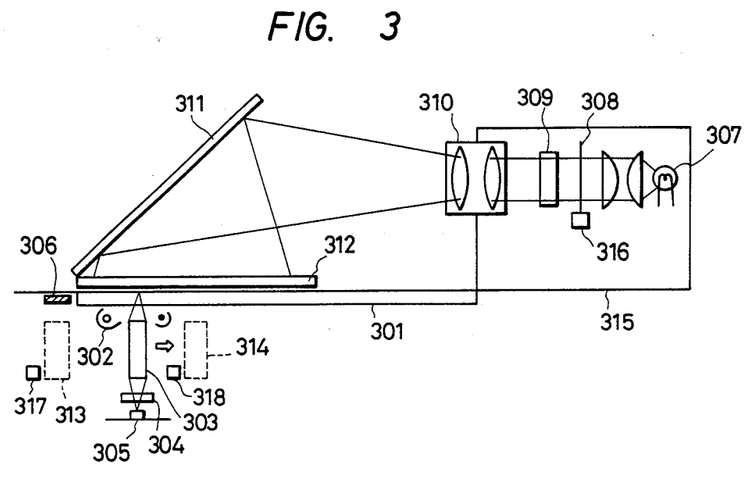
FIG. 3 is a diagram showing an example of an optical arrangement to realize the invention.

FIG. 3 shows an example of an apparatus for reading a transmission original such as a color negative film by use of a color image reading apparatus for photoelectrically converting and reading a color original set on an original base glass. In the diagram, reference numeral 301 denotes an original setting base glass on which to ordinarily set a reflection original such as book, document, or the like; 302 is a light source to illuminate the original; and 305 is a photoelectric converting element array such as a CCD array. R, G, and B filters for color separation are provided for the array 305. Numeral 303 denotes a convergent rod lens array to form an original image onto the array 305. Numeral 304 denotes a filter to cut the unnecessary infrared light. A sensor unit consisting of the light source 302, lens array 303, a filter 304, and photoelectric converting element array 305 is moved in the direction indicated by an arrow and its opposite direction by a driving system (not shown). Numerals 317 and 318 indicate sensors to detect the position of the sensor unit and 306 represents a standard white plate which is used to correct a variation in sensitivity of the sensor.

Numeral 315 denotes a projector to illuminate a transmission original such as a negative film or the like; 307 is a lamp; 308 a film setting portion to which a color film to be read is set; 309 a color correcting filter to correct the color balance; 310 a lens to form a film image onto the glass 301; 316 a sensor to detect whether a film has been set to the film setting portion or not; 311 a mirror to bend the optical path; and 312 a Fresnel lens to convert the light fluxes which are diverged from the lens 310 into the parallel light fluxes.

The Fresnel lens 312 is put so as to closely adhere onto the glass 301. The surface of the lens 312 which is in contact with the glass 301 serves as a dispersive surface. In such an arrangement, in general, in the case of reading a reflection original such as book, document, or the like, the Fresnel lens 312 and mirror 311 are removed from the glass 301, the original set on the glass 301 is exposed by the light source 302, and the original image is scanned to read on a line by line basis by the array 305. An output from the array 305 is A/D converted and output as R, G, and B digital data each of which generally consists of about eight bits.

Figure 1:
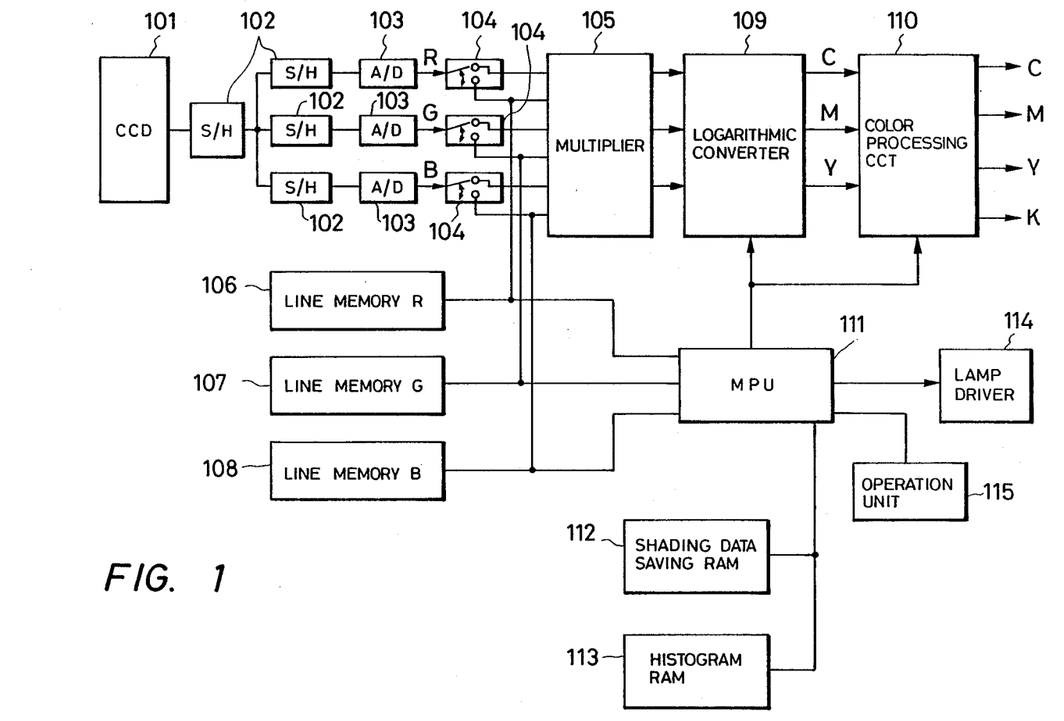
FIG. 1 is a block diagram showing an example of a circuit for a color image reading apparatus to which the present invention is applied.

FIG. 1 shows an example of an image signal processing circuit of the color image reading apparatus shown in FIG. 3.

Figure 2:
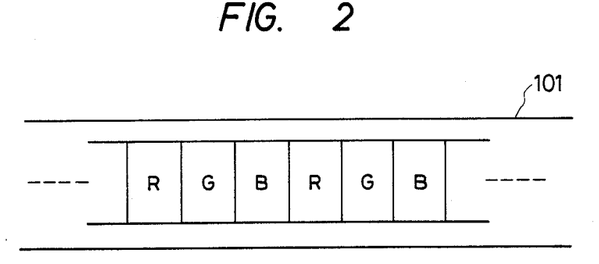
FIG. 2 is a diagram depicting a color separation sensor of three colors.

Reference numeral 101 denotes a CCD line sensor to input an image (corresponding to the photoelectric converting element array 305 shown in FIG. 3). This sensor is a CCD array in which a plurality of photoelectric converting elements are arranged like a line. As shown in FIG. 2, color separation filters of three colors of R (red), G (green), and B (blue) are coated on those photoelectric converting elements every pixel. An image signal which was input from the CCD array 101 is separated and held by sample and hold (S/H) circuits 102 for every color. Further, these image signals are converted into the digital signals of R, G, and B by A/D converters 103 provided every color, thereby obtaining the time series signal of one line of each color. Numerals 106 to 108 denote line memories to store every pixel the respective data of R, G, and B of one line of the CCD to correct a variation in sensitivity of the CCD array 101 or a variation in light quantity of the light source to illuminate the original (hereinafter, this data is referred to as shading data). Each of these line memories is constituted by a semiconductor random access memory RAM.

Numeral 104 denotes selectors to switch the signals to a multiplier 105 when the digital signals from the A/D converter 103 are the image signals and to switch the outputs to the line memories 106 to 108 when those digital signals are the shading data. Switching signals are supplied from an MPU (microprocessor unit) 111 to the selectors 104.

When an original to be read is an ordinary reflection original, the shading data is taken in by the following manner; namely, the sensor unit consisting of the light source 302, lens array 303, filter 304, and photoelectric converting element array 305 is moved to a position 313 in FIG. 3 and the respective color data of one line which are output from the CCD array 101 when the standard white plate 306 was illuminated by the original illuminating lamp 302 are written into the line memories 106 to 108. On the other hand, when the original to be read is the color negative film using the projector 315, the sensor unit is moved to a position 314, the base portion (film on which no image is recorded) of the negative film is set to the film setting portion 308, the lamp 307 is turned on by a reference voltage $V_0$ to project the base film onto the original base glass 301, and the respective color data of one line from the CCD array 101 at that time are written into the line memories 106 to 108.

The multiplier 105 performs arithmetic operations with regard to the image signals indicative of the original image from the A/D converters 103 and the shading data which were read out of the line memories 106 to 108, thereby correcting a variations in outputs in the CCD main scanning direction of the image signals and also correcting the white balances of R, G, and B.

Practically speaking, when a correction signal of eight bits is output using an image signal $S_i$ (eight bits) and shading data $S_s$ (eight bits), a signal $S_c$ after correction (hereinafter, referred to as a standardization luminance signal) is derived as $$S_c = 255 \times S_i / S_s \qquad (1)$$

Although the multiplier 105 can be constituted by a combination of logic circuits, for example, a high speed process can be realized by a look-up table reference system which receives the image signal $S_i$ and shading data $S_s$. The shading data S corresponding to R, G, and B are hereinafter referred to as $S_R$, $S_G$, and $S_B$, respectively. A logarithmic converter 109 is a table to logarithmically convert the image signals which were corrected as explained above into density signals Y (yellow), M (magenta), and C (cyan). Numeral 110 denotes a color processing circuit to perform the color processes such as masking correction, inking, UCR, etc. to the Y, M, and C signals which are output from the logarithmic converter 109, thereby producing the Y, M, C, and K signals to an image output apparatus such as, e.g., a laser printer.

The MPU 111 can directly access the shading data from the line memories 106 to 108. The MPU 111 executes the operation control of the whole apparatus and an algorithm, which will be explained hereinlater, and determines the turn on voltage of the light source 307 of the projector 315.

Numeral 112 denotes a shading data saving RAM to temporarily save the shading data stored in the line memories 106 to 108. Numeral 113 denotes a histogram RAM to store the histogram which is made by an algorithm, which will be explained hereinlater. The RAMs 112 and 113 are accessed by the MPU 111.

Numeral 114 denotes a lamp driver to drive the illuminating lamp 307 of the projector 315. The lamp driver 114 lights on or off the lamp 307 and supplies a current thereto in response to control signals from the MPU 111. Numeral 115 denotes an operation unit by which the operator instructs the start of the reading or sets the reading mode.

A method of deciding the turn on voltage of the lamp 307 of the projector 315 by the MPU 111 will now be described hereinbelow.

In general, assuming that an incident light quantity to a negative film is E and a transmission factor of the film after the developing process is T, the gradation recording characteristic of the color negative film is expressed by the following relation.

$$-\log T = a + \gamma \log E \qquad (2)$$

where, a is a constant and $\gamma$ is a positive constant (hereinafter, referred to as a "$\gamma$ value") which is determined by the negative film which is used.

Figure 4:
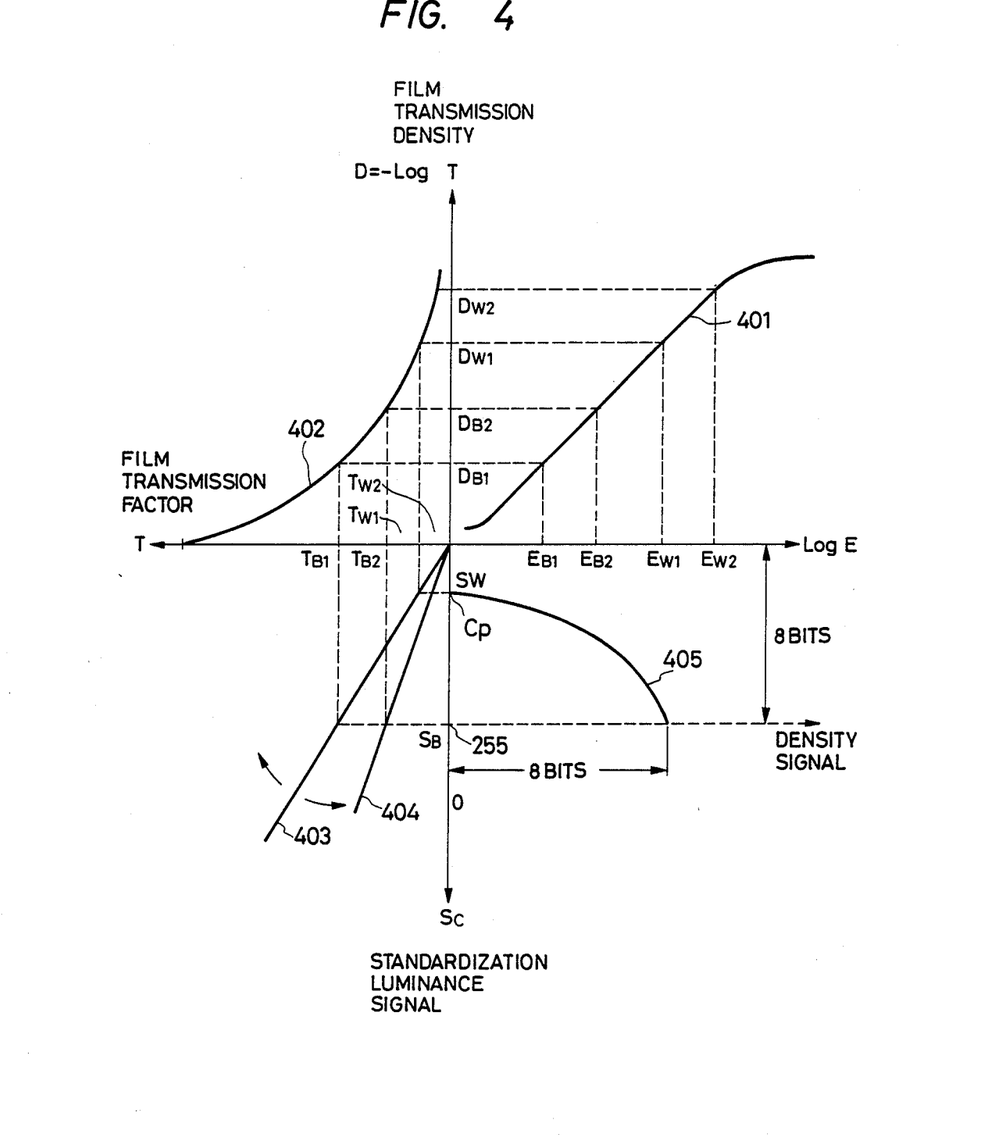
FIG. 4 is a diagram for explaining the conversion from a read signal of a negative film into a density signal of an object to be photographed.

FIG. 4 shows a state in which the incident light quantity E to the film is converted into the density signal. The relation (2) corresponds to the rectilinear region of a curve 401.

In the negative film which was photographed by the proper exposure, when it is now assumed that the incident light quantity to the film corresponding to the black object is $E_{B1}$ and the light quantity corresponding to the white object is $E_{W1}$, the transmission densities which are recorded on the film are expressed b $D_{B1}$ and $D_{W1}$, respectively. Numeral 402 denotes a curve to convert the transmission density into the transmission factor. It will be understood that the transmission factors corresponding to $D_{B1}$ and $D_{w1}$ are $T_{B1}$ and $T_{W1}$.

When the film image is read by the color image reading apparatus with the constitution shown in FIG. 3, signals $P_{B1}$ and $P_{W1}$ corresponding to the black and white objects which are generated from the CCD array 101 shown in FIG. 1 are proportional to the products of a light quantity $\epsilon$ of the lamp 307 and the transmission factors $T_{B1}$ and $T_{W1}$ of the film. Namely, assuming that $\alpha$ is a constant, $$P_{B1} = \alpha T_{B1} \epsilon \text{ and } P_{W1} = \alpha T_{W1} \epsilon \quad \quad (3)$$

After the signals $P_{B1}$ and $P_{W1}$ were A/D converted by the A/D converters 103, they are corrected by the multiplier 105 on the basis of the equation (1), so that standardization luminance signals $S_{B1}$ and $S_{W1}$ are obtained. When the coefficient used in the equation (1) is also included in the constant $\alpha$ and further the equation (2) is used, $$S_{B1} = \alpha \epsilon \frac{1}{10^a E_{B1}^\gamma} \text{ and } S_{W1} = \alpha \epsilon \frac{1}{10^a E_{W1}^\gamma} \quad (4)$$

The equation (4) indicates a straight line 403 in FIG. 4. Now, assuming that the standardization luminance signal consists of eight bits, as will be obvious from FIG. 4, by setting the A/D converters and by setting the light quantity $\epsilon$ of lamp such that the standardization luminance signal $S_{B1}$ corresponding to the black object is just set to 255, digital data having a wide dynamic range and a high efficiency can be obtained.

Figure 5:
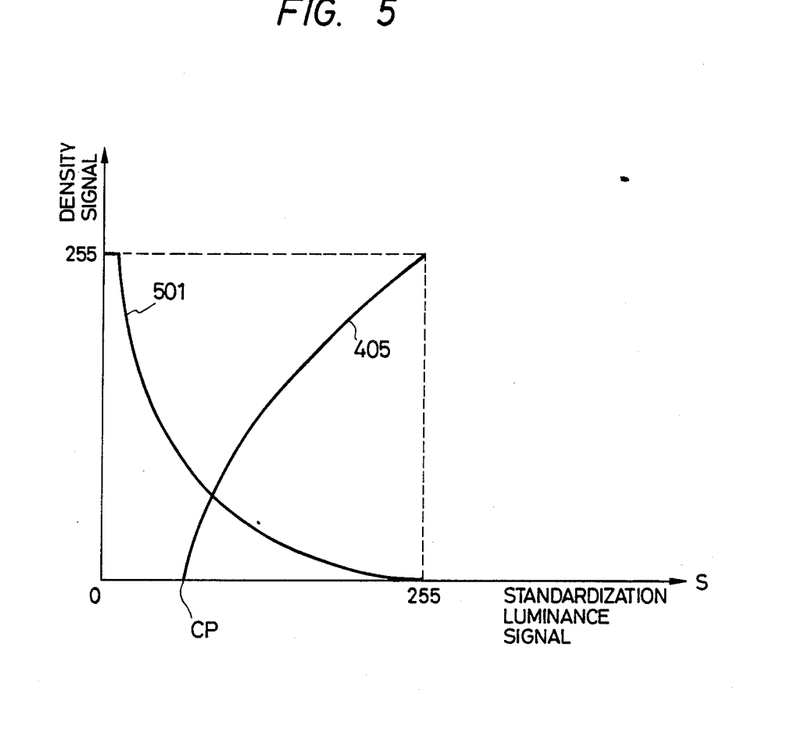
FIG. 5 is a diagram showing curves to convert a sensor output to the density signal of an object to be photographed.

The digital data S obtained in this manner is further logarithmically converted by a curve 405 into the density signal of, e.g., eight bits. The curve 405 relates to the conversion which is executed by the logarithmic converter 109 in FIG. 1 and the reflection density of an object to be photographed is obtained by this conversion. FIG. 5 shows a logarithm converting curve 501 which is used together with the curve 405 shown in FIG. 4 when the reflection original is read. The respective conversion data according to the curves 405 and 501 shown in FIG. 5 are prepared in the logarithmic converter and are switched by the MPU 111.

In FIG. 5, $C_P$ indicates a cut-off point and is a point corresponding to the output $S_{W1}$ corresponding to the white object of the CCD array 101. Since $\alpha$ and $\epsilon$ are set in the equation (4) so that $S_{B1} = 255$, $\alpha \epsilon = 255 \cdot 10^a \cdot E_{B1}^\gamma$, and $S_{W1}$, namely, $C_P$ is expressed as follows.

$$C_P = S_{W1} = 255 \times \left(\frac{E_{B1}}{E_{W1}}\right)^\gamma \quad (5)$$

For example, assuming that the reflection densities of the reference white and reference black of the object to be photographed are respectively 0.05 and 1.5 and the $\gamma$ value of the film is 0.5, the following result is obtained from the equation (5).

$$C_P = 255 \times \left(\frac{10^{-1.5}}{10^{-0.05}}\right)^{0.5} = 48 \quad (6)$$

Next, the case where the original film to be read is projected by the improper exposure will be considered. Namely, it is assumed that the incident light quantity to the film upon photographing is larger than that by the proper exposure and the respective film incident light quantities to the reference black and reference white have, e.g., the values indicated by $E_{B2}$ and $E_{W2}$ in FIG. 4 ($E_{B2} > E_{B1}$, $E_{W2} > E_{W1}$) In this case, assuming that the light quantity $\epsilon$ of the lamp of the projector is constant, the standardization outputs $S_{B2}$ and $S_{W2}$ become $$S_{B2} = \alpha \epsilon \frac{1}{10^a E_{B2}^\gamma} \text{ and } S_{W2} = \alpha \epsilon \frac{1}{10^a E_{W2}^\gamma} \quad (7)$$

as mentioned above from the equation (4) and are normalized such that $S_{B1} = 255$. Thus, $\alpha \epsilon = 255 \cdot 10^a \cdot E_{B1}^\gamma$. The equation (7) will be $$S_{B2} = \left(\frac{E_{B1}}{E_{B2}}\right)^\gamma \times 255 \quad (8)$$

$$S_{W2} = \left(\frac{E_{B1}}{E_{W2}}\right)^\gamma \times 255 = \left(\frac{E_{W1}}{E_{W2}}\right)^\gamma \times C$$

Since $E_{B1}/E_{B2} = E_{W1}/E_{W2}$, when this value is set to $1/k$, it is sufficient to set the light quantity $\epsilon$ of lamp into $k$ $\epsilon$ so as to obtain $$S_{B2} = 255 \times \left(\frac{1}{k}\right)^\gamma \text{ and } S_{W2} = C \times \left(\frac{1}{k}\right)^\gamma \quad (9)$$

namely, so as to again obtain $S_{B2} = 255$ and $S_{W2} = C_P$ in the equation (9). This corresponds to replacing the straight line 403 in FIG. 4 with a straight line 404. Eventually, when the incident light quantity to the film upon photographing is k times as large as that at the proper exposure, if the light quantity of lamp of the projector is increased by $k^\gamma$ times, the standardization signal such that the reference black is set to 255 and the reference white is set to $C_P$ is always output. Further, the density signal of the object to be photographed can be obtained by the logarithmic conversion using the curve 405.

However, since the exposure multiple upon photographing is actually unknown, the image density on the film must be sampled to determine the light quantity of lamp.

Figure 6:
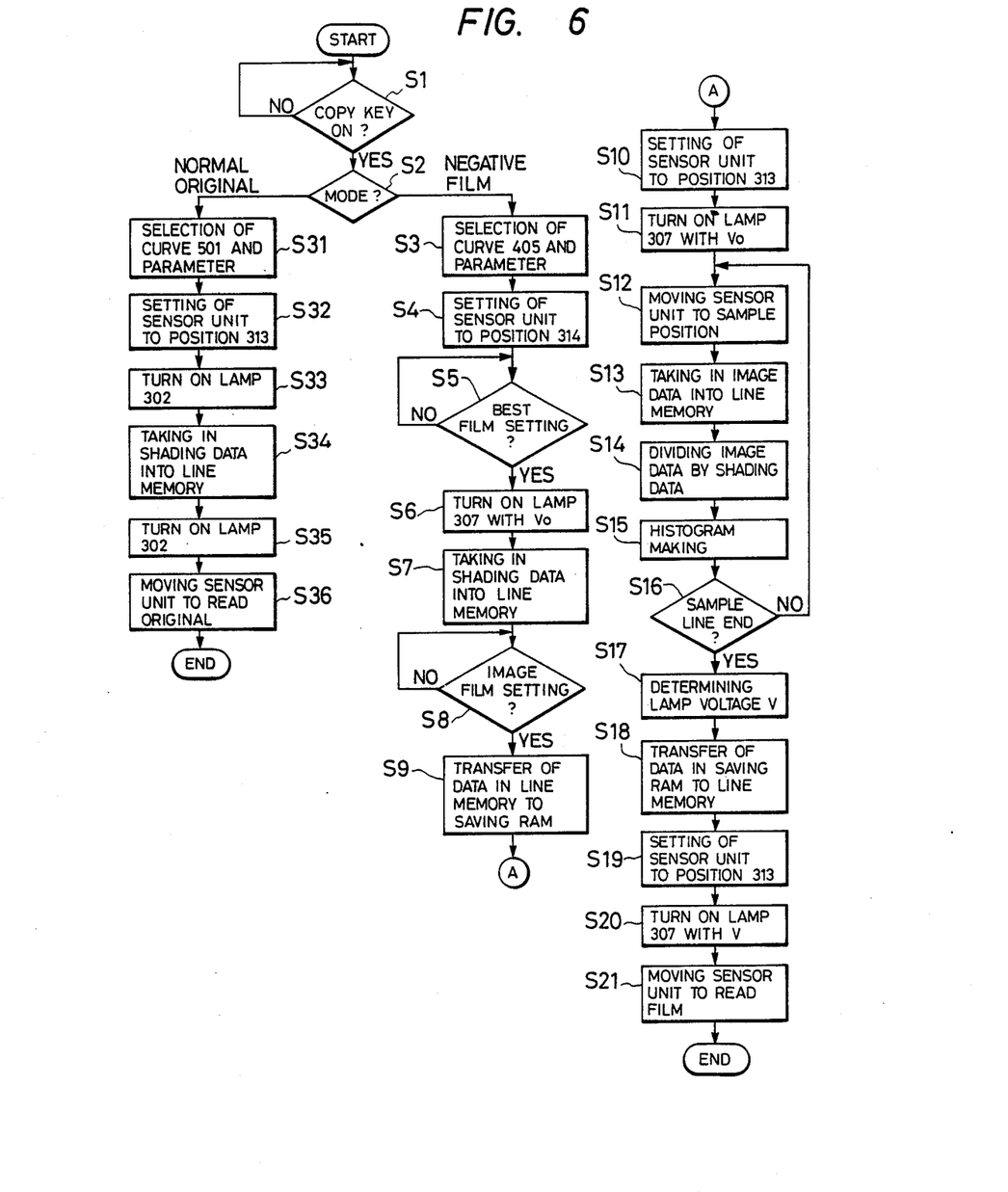
FIG. 6 is a flowchart showing the flow of a control procedure.

This method will now be described with reference to FIG. 6. FIG. 6 shows a flowchart for a control procedure of the MPU 111. In the first step S1, when it is detected that the copy key has been turned on, a check is made in step S2 to see if the reading mode has been set or not. When the reading mode of the negative film is selected, the logarithmic conversion table in the logarithmic converter 109 is switched from the curve 501 to the curve 405 in FIG. 5 in step S3. Similarly, various kinds of parameters in the color processing circuit 110 are switched in step S3. Next, the shading data is taken in. Namely, in step S4, the sensor unit is moved to the central portion of the projection image area (i.e., to the position 314 shown in FIG. 3). In step S5, if the unexposed portion (base film) of the film which is used or the insertion of the filter corresponding to the unexposed portion has been detected, the lamp 307 of the projector 315 is turned on with the reference voltage $V_0$ in step S6. In step S7, the selector 104 is switched to the side of the line memories 106 to 108 and the respective color data of one line of the CCD array 101 in the central portion of the projection image region are written into the line memories 106 to 108.

After the shading data has completely been taken in, the lamp 307 of the projector 315 is once turned off. In the next step S8, if the image film to be actually read has been set to the film setting portion 308, the sampling to discriminate the exposure state of the film is performed. First, in step S9, the contents of the line memories 106 to 108 are saved into the shading data saving RAM 112. The sensor unit is moved to the position 313 (home position) in step S10. Further, in step S11, the lamp 307 of the projector is turned on with the reference voltage $V_0$. In step S12, the sensor unit is moved to a predetermined sample position of the projection image portion. In step S14, the image is read at that position and the image data of one line of R, G, and B are written into the line memories 106 to 108. In step S14, the correcting arithmetic operations for the standardizing processes in the equation (1) are sequentially executed every pixel by the shading data saved in the saving RAM 112 with respect to each of R, G, and B for the image data stored in the line memories 106 to 108. In this manner, the standardization luminance signal values $S_R$, $S_G$, and $S_B$ of R, G, and B which were corrected every pixel are obtained. In step S15, only when the values $S_R$, $S_G$, and $S_B$ satisfy the conditions, which will be explained hereinlater, "1" is added to the data in the address corresponding to the $S_R$ of the histogram RAM 113.

These operations are repeated with regard to all of the sample lines of a predetermined number (step S16). The taking-in operation of the projection image in step S13 is executed with respect to a predetermined plurality of sample lines. Until all of the plurality of lines are finished, the foregoing arithmetic operations are repeated.

After completion of the operations of all lines, in step S17, the MPU 111 refers the content of the histogram RAM 113 and determines a lamp turn on voltage V so as to obtain the light quantity of projecting lamp which is necessary to properly read the projection image. At this time, the lamp 307 is once turned off.

Figure 7:
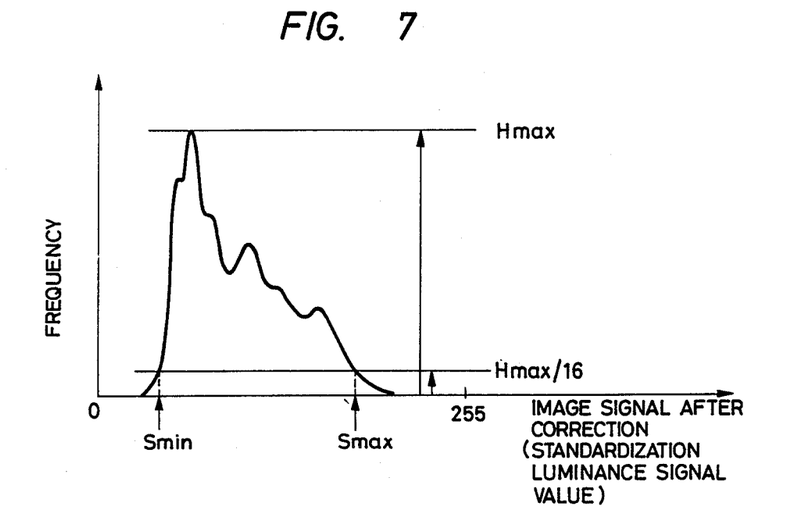
FIG. 7 is a diagram showing an example of a histogram of an image.

In step S17, the lamp turn on voltage is determined in the following manner. The frequency of the image signal value as shown in FIG. 7 is stored in the histogram RAM 113. The signal value corresponding to the left end of the peak portion of this histogram is considered to be equal to $S_{W1}$ in the equation (4). The signal value corresponding to the right end is considered to be equal to $S_{B1}$. Therefore, in order to eliminate the influence by the noise or the like, as shown in FIG. 7, the histogram is cut by the value which is obtained by decreasing the maximum value $H_{max}$ of the frequency into, e.g., 1/16. The signal value which gives the cross point of that value and the histogram is extracted as $S_{min}$ and $S_{max}$. The extracted value $S_{min}$ represents the reference white level. The extracted value $S_{max}$ indicates the reference black level.

As already mentioned above, it is sufficient to decide the lamp turn on voltage V so as to obtain $$S_{max}=255 \text{ and } S_{min}=C_P \quad (10)$$

Figure 8:
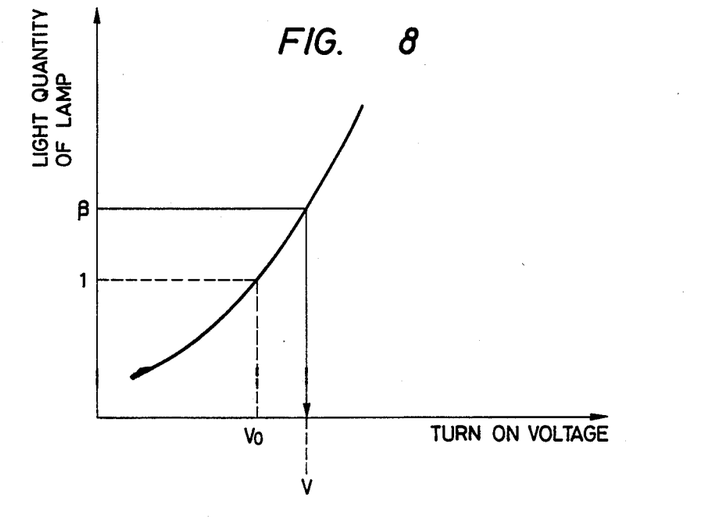
FIG. 8 is a diagram showing the relation between the light quantity of a projecting lamp and the turn on voltage.

However, as shown in FIG. 7, in the histogram for an ordinary film image, the leading portion near the $S_{min}$ is steeper than the trailing portion near the $S_{max}$. Even if the value to cut the histogram slightly changes, the value $S_{min}$ does not so largely change. The value of a high reliability can be obtained. Therefore, a multiple $\beta$ which is expressed by $$\beta = C_P/S_{min} \quad (11)$$

is obtained and the turn on voltage value V such that the light quantity of lamp is increased by $\beta$ times is set to a value which should be derived. At this time, it will be understood from FIG. 4 that the value $S_{max}$ is automatically set to 255. FIG. 8 is a graph showing the relative light quantity ratio in the case where the turn on voltage was changed to the light quantity of lamp with the reference turn on voltage $V_0$. It is sufficient that this data is preliminarily stored into the ROM area in the MPU 111 and the value of $\beta$ is converted into V and output. Since the V has the digital value, it is converted by the D/A converter and the resultant analog value is supplied to a variable voltage power source (CVR) of the lamp driver 314 to drive the lamp 307 of the projector, thereby allowing the voltage V (volts) to be applied to the lamp at the start of the reading operation.

The lamp 307 is driven using the lamp voltage V which was decided as explained above and the film is exposed. The transmitted light is projected to the Fresnel lens 312 put on the original setting base glass 301 as mentioned above, thereby reading the film image. Namely, in step S18, the shading data of the respective colors which have once been stored in the saving RAM 112 are transferred to the line memories 106 to 108. In step S19, the sensor unit is moved to the position 313 (home position). In the next step S20, the lamp 307 is turned on with the lamp voltage V which was determined as explained above and the film image is projected to the Fresnel lens 312. In step S21, the sensor unit is moved in the direction of the arrow and the film image is read one line by one by the CCD array 101. At this time, the shading corrections of the respective color image signals derived by the reading are executed by the multiplier 105 by use of the shading data stored in the line memories 106, 107, and 108.

Figure 9:
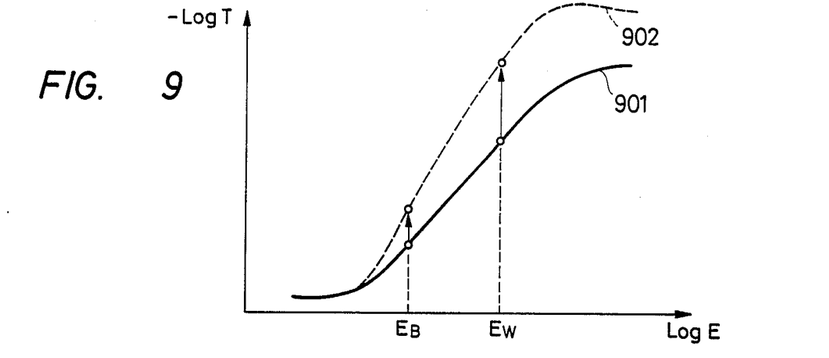
FIG. 9 is a diagram for explaining an interimage effect of a color negative film.

On the other hand, if the object of the image recorded on the color negative film to be read is constituted by only the colors of relatively low saturations in the above description, no inconvenience will occur even when considering that the value of $S_{min}$ indicates the white portion of the object. However, as shown in FIG. 9, the gradation characteristic of the negative film largely changes depending on the color tone of the object due to the interimage effect. Namely, when the film was exposed by the white light, the transmission density T of the film changes in accordance with a curve 901. However, when the film was exposed by the color light having a high saturation, the transmission density T changes in accordance with a curve 902. Thus, the film density rises and the value of $S_{min}$ which is obtained by the foregoing method apparently decreases.

Therefore, when the foregoing histogram is made, if a certain relation is satisfied among the luminance signals $S_R$, $S_G$, and $S_B$, it is necessary that the addition to the histogram is not performed to thereby prevent the detection of the erroneous $S_{min}$ value. This method will now be explained hereinbelow.

For example, in the case of making the histogram to the luminance signal $S_R$ of R, when the color of the object lies within a range from the yellow system to the red system, the film density increases due to the interimage effect and the $S_R$ decreases. Therefore, the resultant $S_{min}$ value is also smaller than the actual white level.

On the other hand, when the film which was obtained by photographing the object of the color which lies within a range from the yellow system to the red system is read by the present method and the standardization luminance signals $S_R$, $S_G$, and $S_B$ of R, G, and B are obtained, the following relation exists among the $S_R$, $S_G$, and $S_B$.

$$S_B > S_r > S_g \text{ or } S_G > S_B > S_R \quad \ldots (12)$$

Figure 10A:
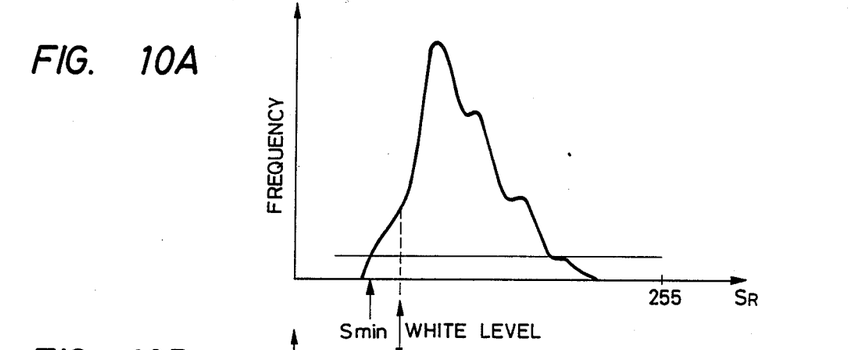
FIGS. 10A and 10B are diagrams for explaining changes in shape of histograms in dependence on the presence or absence of the setting of the conditions when making histograms.
Figure 10B:
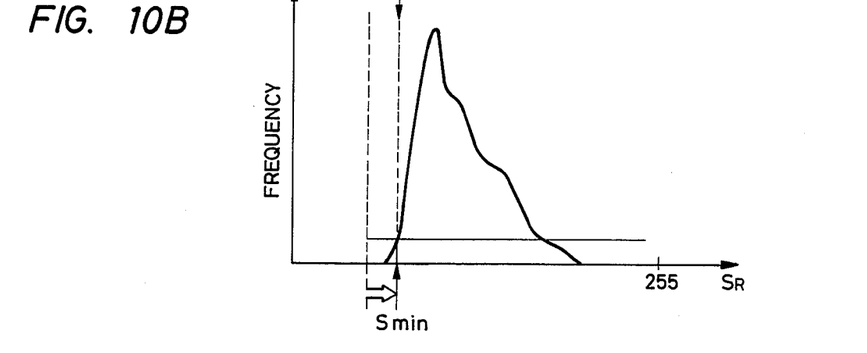

Therefore, with respect to the luminance signal $S_R$ of the pixel which satisfies the equation (12), if the addition to the histogram is not performed, the erroneous detection of $S_{min}$ can be prevented. FIG. 10 shows a state of the erroneous detection of the $S_{min}$ value. FIG. 10A shows the example in the case where the histogram was made with respect to all of the sampled pixels without using the condition of the relation (12). Since many objects of the colors which fall within a range from the yellow system to the red system exist as objects to be photographed, the histogram is widened to the lower side of $S_R$. Therefore, the value of $S_{min}$ which is obtained is also lower than the actual white level. On the other hand, FIG. 10B shows the example of the histogram in the case where the condition of the relation (12) was set to the same image. It will be understood that the $S_{min}$ value coincides with the actual white level.

Therefore, by setting the condition of (12), the light quantity suitable to read the film image can be decided.

In the above description, the histogram has been made with respect to $S_R$ among the standardization luminance signals $S_R$, $S_G$, and $S_B$ of R, G, and B and the light quantity of lamp has been determined in accordance with the $\gamma$ characteristic of R of the negative film. However, the $\gamma$ value of the respective R, G, and B of the negative film differ and the $C_P$ values also differ. Therefore, the accurate density signals regarding G and B other than R cannot be obtained on the basis of only the change in light quantity of lamp. However, for example, if the correction by the analog amplification gain of the CCD or the correction by the masking coefficients in the color processing circuit or the like is also together used, the proper density signals can be obtained with respect to all of the R, G, and B.

When the ordinary original reading mode was selected, the curve for reading an ordinary original is set into the logarithmic converter 109 in step S31. The sensor unit is set to the position 313 in step S32. The lamp 307 is turned on at that position in step S33. The shading data obtained by reading the standard white plate 306 by the CCD array 101 are stored into the line memories 106 to 108 in step S34. Thereafter, the lamp 307 is again turned on in step S35. The sensor unit is moved in step S36 and the original image is read and scanned on a line by line basis. At this time, the shading data of the respective colors which were stored in the line memories 106 to 108 are used, and the shading correcting processes are executed to the image signals of the respective colors from the CCD array 101.

In the foregoing embodiment, the method whereby the lamp turn on voltage is changed so as to obtain $S_{min} = S_P$ has been shown. The similar effect can be also obtained by various kinds of methods whereby a light quantity diaphragm is attached to the projecting lens and this diaphragm is opened or closed, whereby the gain of the analog amplifier of the CCD is adjusted, and the like.

Obviously, the conditional equation which is set when a histogram is made is not limited to the relation (12).

According to the foregoing embodiment, the image signal of the color negative film can be effectively output as the digital density signal of the limited number of bits and also it can be always obtained as the same object density signal irrespective of the exposure state of the negative film upon photographing.

Although the present invention has been shown and described with respect to a preferred embodiment, the invention is not limited to this embodiment. Various changes and modifications which are obvious to a person skilled in the art to which the invention pertains are possible within the spirit and scope of the appended claims of the invention.

I claim:

1. An image reading apparatus comprising:
    exposing means for exposing an original image;
    reading means for reading an image by photoelectrically converting a light from the exposed original image;
    detecting means for detecting a density of said image on the basis of a histogram of an output from said reading means; and
    control means for controlling an exposure light quantity of said exposing means in accordance with the image density detected by said detecting means.

2. An apparatus according to claim 1, wherein the original image includes a color film image, and said reading means reads the image recorded on a a color film by photoelectrically converting a transmission light from the exposed color film.

3. An apparatus according to claim 1, wherein said detecting means detects the image density on the basis of an output of a special color which is output from said reading means.

4. An apparatus according to claim 1, wherein said control means controls the exposure light quantity of said exposing means in accordance with the image density detected by said detecting means, and in addition a base density of the original image.

5. An apparatus according to claim 1, wherein said detecting means detects the image density on the basis of the output of said reading means in accordance with a special condition.

6. A color image reading apparatus comprising:
    process means including exposing means for exposing a color film, and reading means for reading an image recorded on the color film by photoelectrically converting a transmission light from the exposed color film;

detecting means for detecting a base density of the color film and a density of said image; and control means for controlling said process means in accordance with the base density and the image density which were detected by said detecting means.

7. An apparatus according to claim 6, wherein said detecting means detects the base density and the image density on the basis of an output of said reading means.

8. An apparatus according to claim 6, wherein said control means controls an exposure light quantity of said exposing means.

9. An apparatus according to claim 6, wherein said detecting means detects the image density on the basis of a histogram of an output of said reading means.

10. An apparatus according to claim 1, wherein said reading means reads the original image line by line.

11. An apparatus according to claim 10, wherein said detecting means detects the image density on the basis of the output from said reading means, said output corresponding to a predetermined portion of the original image.

12. An apparatus according to claim 11, wherein said detecting means detects the image density on the basis of the output from said reading means which output corresponds to a predetermined number of lines of the original image.

13. An apparatus according to claim 1, wherein said detecting means detects the image density by obtaining a reference white level from the histogram of the output from said reading means.

14. An apparatus according to claim 1, wherein said detecting means detects the image density when a predetermined relationship is established among a plurality of signals which together constitute a color image signal from said reading means.

15. An apparatus according to claim 9, wherein said detecting means detects the image density by obtaining a reference white level from the histogram of an output of said reading means.

16. An apparatus according to claim 6, wherein said reading means reads the image recorded on the color film line by line.

17. An apparatus according to claim 16, wherein said detecting means detects the density of the image on the basis of an output of said reading means which output corresponds to a predetermined portion of the image recorded on the color film.

18. An apparatus according to claim 17, wherein said detecting means detects the image density on the basis of the output of said reading means which output corresponds to a predetermined number of lines of the image recorded on the color film.

19. An apparatus according to claim 7, wherein said detecting means detects the image density on the basis of the output of said reading means in accordance with a predetermined condition.

20. An apparatus according to claim 7, wherein said detecting means detects the image density on the basis of an output of a special color which is output from said reading means.

21. An apparatus according to claim 7, wherein said detecting means detects the image density when a predetermined relationship is established among a plurality of signals which together constitute a color image signal from said reading means.

22. An image reading apparatus comprising:
exposure means for exposing an image;
read means for reading the image by photoelectrically converting the exposed image line by line;
output means for outputting an output of said read means into an image output apparatus;
detection means for detecting a density of the image on the basis of the output of said read means, said output corresponding to a predetermined portion in the image; and
control means for controlling an exposure light quantity of said exposure means in accordance with the image density detected by said detection means and a base density of the image.

23. An apparatus according to claim 22, wherein said detection means detects the image density on the basis of a histogram of the output of said read means which output corresponds to a predetermined number of lines of the image.

24. An apparatus according to claim 22, wherein said detection means detects the image density on the basis of an output of a special color which is output from said read means.

25. An apparatus according to claim 22, wherein said image output apparatus includes a laser printer.

26. An apparatus according to claim 22, wherein said detection means detects the image density on the basis of the output of said read means in accordance with a predetermined condition.

27. An apparatus according to claim 22, wherein said detection means detects the image density by obtaining a reference white level from the histogram of the output of said read means.

28. An apparatus according to claim 22, wherein said detection means detects the image density when a predetermined relationship is established among a plurality of signals which together constitute a color image signal from said read means.

29. An apparatus according to claim 22, wherein the image includes a color film image, and said read means reads the image recorded on a color film by photoelectrically converting a transmission light from the exposed image.

30. An apparatus according to claim 22, wherein said detection means detects the image density on the basis of the output of said read means which output corresponds to a predetermined number of lines on the image.

31. An image reading apparatus comprising:
exposure means for exposing an image;
read means for reading the image by photoelectrically converting the exposed image line by line;
output means for outputting an output of said read means into an image output apparatus;
detection means for detecting a density of the image on the basis of the output of said read means, said output corresponding to a predetermined number of lines on the image; and
control means for controlling an exposure light quantity of said exposure means in accordance with the image density detected by said detection means.

32. An apparatus according to claim 31, wherein said detection means detects the image density on the basis of a histogram of the output of said read means which output corresponds to a predetermined number of lines of the image.

33. An apparatus according to claim 31, wherein said detection means detects the image density on the basis of an output of a special color which is output from said read means.

34. An apparatus according to claim 31, wherein said control means controls the exposure light quantity of said exposure means in accordance with the image density detected by said detection means, and in addition a base density of the image.

35. An apparatus according to claim 31, wherein said detection means detects the image density on the basis of the output of said read means in accordance with a predetermined condition.

36. An apparatus according to claim 31, wherein said detection means detects the image density by obtaining a reference white level from the histogram of the output of said read means.

37. An apparatus according to claim 31, wherein said detection means detects the image density when a predetermined relationship is established among a plurality of signals which together constitute a color image signal from said read means.

38. An apparatus according to claim 31, wherein the image includes a color film image, and said read means reads the image recorded on a color film by photoelectrically converting a transmission light from the exposed image.

39. An apparatus according to claim 31, wherein said image output apparatus includes a laser printer.

* * * * *

UNITED STATES PATENT AND TRADEMARK OFFICE
CERTIFICATE OF CORRECTION

PATENT NO. : 4,891,692
DATED : January 2, 1990
INVENTOR(S) : KENICHI OUTA

Page 1 of 2

It is certified that error appears in the above-identified patent and that said Letters Patent is hereby corrected as shown below: On the title page:

AT [56] REFERENCES CITED

U.S. Patent Documents, "Alhofer" should read --Alkofer--.
Foreign Patent Documents, "58-19587A 11/1983 Japan" should read --58-195847A 11/1983 Japan--.

COLUMN 4

Line 21, "$S_c = 255 \times S_i i/S_s$   (1)" should read
--$S_c = 255 \times S_i/S_s$   (1)--.
Line 27, "shading data S" should read
--shading data $S_c$--.

COLUMN 5

Line 15, "b $D_{B1}$" should read --by $D_{B1}$--.
Line 54, "i" should read --is--.

COLUMN 6

Line 2, "$C_p - S_{w1} = 255 \times \left(\frac{E_{B1}}{E_{w1}}\right) \gamma$   (5)" should read
--$C_p = S_{w1} = 255 \times \left(\frac{E_{B1}}{E_{w1}}\right) \gamma$   (5)--.

Line 23, "$4(E_{B2} > E_{B1}, E_{w2} > E_{w1})$ In" should read
--$4(E_{B2} > E_{B1}, E_{w2} > E_{w1})$. In--.

Line 43, "$K^{65}$" should read --$K^\gamma$--.

UNITED STATES PATENT AND TRADEMARK OFFICE
CERTIFICATE OF CORRECTION

PATENT NO. : 4,891,692

DATED : January 2, 1990

INVENTOR(S) : KENICHI OUTA

It is certified that error appears in the above-identified patent and that said Letters Patent is hereby corrected as shown below:

COLUMN 7

Line 31, "$V_0$ In" should read --$V_0$. In--.

COLUMN 10

Line 47, "a a" should read --a--.

Signed and Sealed this

Eighteenth Day of June, 1991

Attest:

HARRY F. MANBECK, JR.

Attesting Officer

Commissioner of Patents and Trademarks